United States Patent [19]

Groezinger

[11] Patent Number: 4,969,202
[45] Date of Patent: Nov. 6, 1990

[54] IMAGE RECOGNITION EDGE DETECTION METHOD AND SYSTEM

[75] Inventor: John L. Groezinger, Madison, Wis.

[73] Assignee: Honeywell Inc., Minneapolis, Minn.

[21] Appl. No.: 175,715

[22] Filed: Mar. 31, 1988

[51] Int. Cl.$^5$ .............................................. G06K 9/48
[52] U.S. Cl. ...................................... 382/22; 382/27; 382/30
[58] Field of Search ...................... 382/22, 52, 27, 30, 382/50, 53

[56] References Cited

U.S. PATENT DOCUMENTS

| | | | |
|---|---|---|---|
| 3,737,855 | 6/1973 | Cutaia | 382/52 |
| 3,911,212 | 10/1975 | Yoshizawa et al. | 382/52 |
| 4,083,035 | 4/1978 | Riganati et al. | 382/27 |
| 4,501,016 | 2/1985 | Persoon et al. | 382/22 |
| 4,630,306 | 12/1986 | West et al. | 382/22 |
| 4,630,307 | 12/1986 | Cok | 382/27 |
| 4,644,410 | 2/1987 | Schlichty | 382/52 |
| 4,791,675 | 12/1988 | Deering et al. | 382/27 |
| 4,799,270 | 1/1989 | Kim et al. | 382/27 |

*Primary Examiner*—David K. Moore
*Assistant Examiner*—Joseph Mancuso
*Attorney, Agent, or Firm*—Charles L. Rubow

[57] ABSTRACT

A system and method for determining and representing the edges of an object in an image frame formed of a two dimensional array of pixels represented by a first array of values, each value representing the gray scale of a separate pixel in the image frame. A second two dimensional array of values is produced comprising a first value for each pixel whose gray scale value is less than or equal to the threshold value and a second value for each pixel whose gray scale value is greater than the threshold value. Square groupings of four values in the second array of values are examined and a third two dimensional array of values is produced to correspond to the arrangement of the square groupings of four adjacent pixels, each of the values in the third array having a third value if diagonally located values of the grouping are the same, and having a fourth value if the diagonally located values of the grouping are different.

9 Claims, 6 Drawing Sheets

|   | 1 | 2 | 3 | 4 | 5 | 6 | 7 | 8 |
|---|---|---|---|---|---|---|---|---|
| 1 | 2 | 2 | 2 | 2 | 2 | 2 | 2 | 2 |
| 2 | 2 | 2 | 4 | 7 | 5 | 2 | 2 | 2 |
| 3 | 2 | 2 | 8 | 10 | 9 | 3 | 2 | 2 |
| 4 | 2 | 3 | 9 | 10 | 5 | 2 | 2 | 2 |
| 5 | 3 | 9 | 10 | 10 | 6 | 2 | 2 | 2 |
| 6 | 4 | 9 | 10 | 10 | 7 | 2 | 2 | 2 |
| 7 | 2 | 3 | 4 | 4 | 2 | 2 | 2 | 2 |
| 8 | 2 | 2 | 2 | 2 | 2 | 2 | 2 | 2 |

*Fig. 4a*

| MAX 2 MIN 2 | | | | | | | MAX 2 MIN 2 |
|---|---|---|---|---|---|---|---|
| MAX 2 MIN 2 | MAX 2 MIN 2 | MAX 4 MIN 2 | MAX 7 MIN 2 | | | | MAX 7 MIN 2 |
| MAX 7 MIN 2 | MAX 7 MIN 2 | MAX 8 MIN 2 | MAX 10 MIN 2 | | | | MAX 10 MIN 2 |
| MAX 10 MIN 2 | | | | | | | MAX 10 MIN 2 |
| MAX 10 MIN 2 | | | | | | | MAX 10 MIN 2 |
| | | | | | | | |
| | | | | | | | |
| MAX 10 MIN 2 | | | | | | | MAX 10 MIN 2 |

*Fig. 4b*

|   | 1 | 2 | 3 | 4 | 5 | 6 | 7 | 8 |
|---|---|---|---|---|---|---|---|---|
| 1 | <t | <t | <t | <t | <t | <t | <t | <t |
| 2 | <t | <t | <t | >t | <t | <t | <t | <t |
| 3 | <t | <t | >t | >t | >t | <t | <t | <t |
| 4 | <t | <t | >t | >t | <t | <t | <t | <t |
| 5 | <t | >t | >t | >t | =t | <t | <t | <t |
| 6 | <t | <t | >t | >t | >t | <t | <t | <t |
| 7 | <t | <t | <t | <t | <t | <t | <t | <t |
| 8 | <t | <t | <t | <t | <t | <t | <t | <t |

*Fig. 4c*

|   | 1 | 2 | 3 | 4 | 5 | 6 | 7 |
|---|---|---|---|---|---|---|---|
| 1 | d | d | c | c | d | d | d |
| 2 | d | c | c | c | c | d | d |
| 3 | d | c | d | c | c | d | d |
| 4 | c | c | d | c | d | d | d |
| 5 | c | c | d | c | c | d | d |
| 6 | d | c | c | c | c | d | d |
| 7 | d | d | d | d | d | d | d |

*Fig. 4d*

IMAGE RECOGNITION EDGE DETECTION METHOD AND SYSTEM

BACKGROUND OF THE INVENTION

The invention disclosed herein relates generally to image recognition methods and systems, and more specifically to a simple low cost edge extraction operator to convert gray scale information into binary edge information necessary to allow measurement and data acquisition.

Machine vision systems are becoming increasingly in demand for a wide variety of tasks, of which examples include object recognition, parts inspection, automatic production and assembly by robots, surveillance of scene to determine any changes with time, and many other applications. A straight forward approach to handling these tasks involves subdividing a scene into pixels, the number of which depends on the required resolution. Each pixel is then examined to determine the gray scale of light received therefrom, and perhaps other variables. The information from each pixel may then be compared with that of surrounding pixels or of the same pixel from a preceding frame, and then combined with information derived from other pixels and/or otherwise processed to provide object detection, recognition, inspection, etc. Such an approach generally results in processing much unuseful information which results in wasted time and places unnecessary demands on the processing system. The reason that this approach is inefficient is that a majority of a scene is frequently relatively uniform background around a single object of interest. In addition, much of the view of an object within its edges may be uniform and not useful for detection, recognition and inspection purposes. Thus, in many instances only the location of the edges of an object is necessary for performance of a required task. Ignoring information as to the uniform background and uniform interior surface of an object generally results in substantial decreases in imaging processing time and demands placed on the processing system.

The applicant has devised a unique, simple and low cost approach to detecting and representing the edges of an object which avoids the disadvantages of more elaborate conventional approaches, and yet meets the requirements of a large variety of situations.

SUMMARY OF THE INVENTION

The present invention is a method and apparatus for determining and representing the edges of an object in an image frame formed of a two dimensional array of pixels represented by a first array of values, each value representing the gray scale of a separate pixel. The method comprises the steps of determining a gray scale threshold value, producing a second plurality of values comprising a first value for each pixel whose gray scale value has a predetermined relationship to the threshold value and a second value for each pixel whose gray scale value does not have the predetermined relationship to the threshold value, and examining groups of values in the second plurality of values corresponding to square groupings of adjacent pixels. A two dimensional array of values is then produced to correspond to the arrangement of the square groupings of four adjacent pixels, each of the values in the array having a third value if diagonally located values of the grouping in the array are the same and a fourth value if diagonally located values of the grouping in the array of values are different, whereby the fourth values represent the edges of the object in the image frame.

Apparatus according to the invention comprises means for producing a first plurality of values in which each value represents the gray scale of a separate pixel in an image frame, means for determining a gray scale threshold value, means for producing a second plurality of values comprising a first value for each pixel whose gray scale value has a predetermined relationship to the threshold value and a second value for each pixel whose gray scale value does not have the predetermined relationship to the threshold value, and means for examining groups of values in the second plurality of values corresponding to square groupings of adjacent pixels and producing a two dimensional array of values arranged to correspond to the arrangement of the square groupings of four adjacent pixels, each of the values in the array having a third value if diagonally located values of the groupings in the array of values are the same or a fourth value if the diagonally located values in the groupings in the array of values are different.

BRIEF DESCRIPTION OF THE DRAWINGS

FIGS. 4, 4a–4d represent certain arrays of values generated by the system of FIG. 1 in determining and representing the edges of an object in an image frame.

DESCRIPTION OF THE PREFERRED EMBODIMENT

The present invention may be used with a matrix of any number of pixels. A greater number of pixels produces higher resolution and a more precise image of the object of interest. However, a greater number of pixels also requires more memory and data processing capability. The present invention has been found highly useful with a matrix of 32 by 32 pixels. However, to simplify illustration of operation of the present invention with particular reference to FIG. 4, a matrix of 8 by 8 pixels is shown and described.

Figure 1:
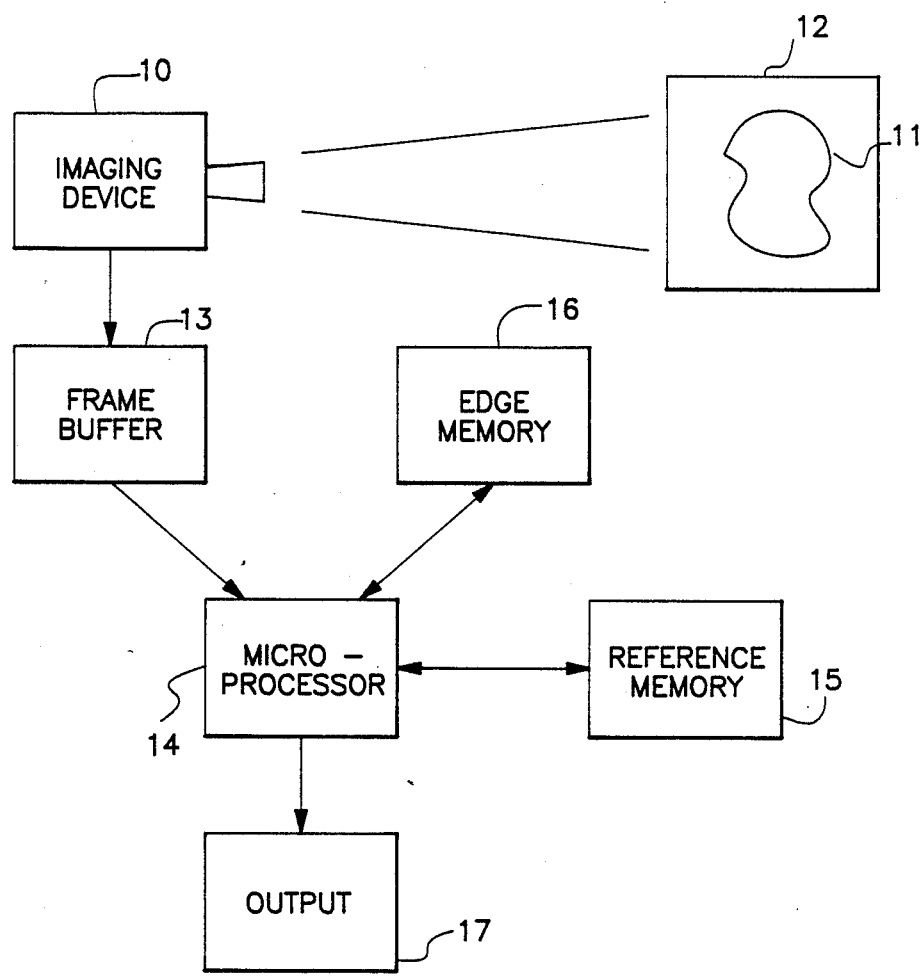
FIG. 1 is a block diagram of an image recognition edge detection system in accordance with the present invention.

FIG. 1 illustrates a typical machine vision system including an imaging device 10 for viewing an object 11 within an image frame 12. Device 10 produces binary signals sequentially indicative of the gray scales of the pixels forming image frame 12. For example, the signals produced by device 10 may represent any one of 64 discrete gray scale values for each pixel. The array of gray scale values is transmitted to an image memory 13 under the control of a microprocessor 14 which operates as directed by software and which, among other things, implements the threshold determining algorithm of FIG. 2 and the edge detection algorithm of FIG. 3.

Figure 2:
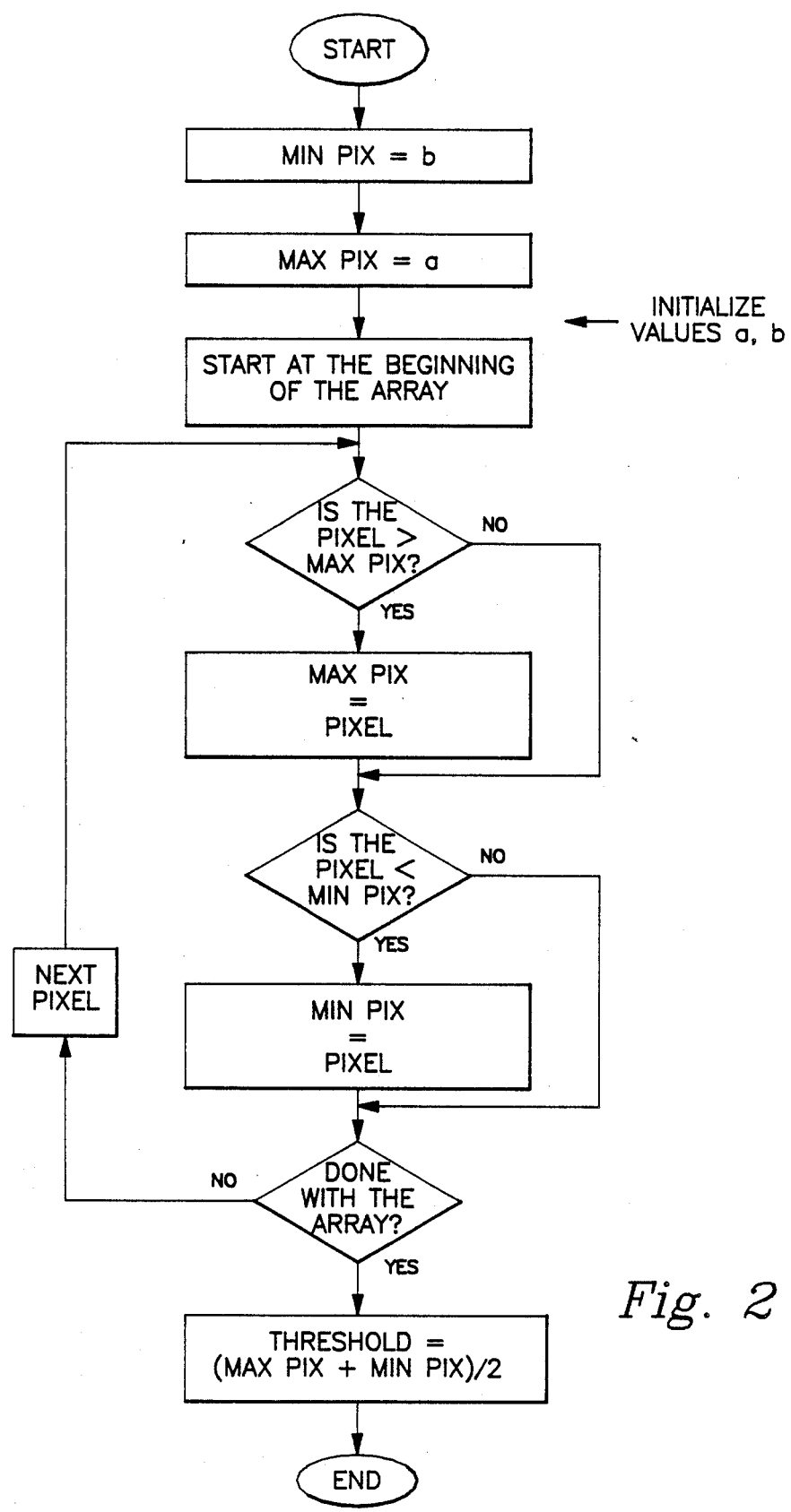
FIG. 2 is a logic and flow diagram of an algorithm used in the system of FIG. 1 for adaptively determining gray scale threshold values.

A reference memory 15 under the control of microprocessor 14 is used to store intermediate and final values resulting from operation of the threshold determinating algorithm of FIG. 2. An edge memory 16, also under the control of microprocessor 14, functions to store an array of values resulting from operation of the edge detection algorithm of FIG. 3, each of the array of values having first or second values, the first value occurring only if the corresponding pixel is determined to coincide with an edge of the object. Once the edges of the object have been determined, as represented by the contents of edge memory 16, the edges of the object may be represented on an output device 17.

After initializing the system, the first major operation involves determining a threshold gray scale value. A suitable threshold value has been found to be the median gray scale value of all the pixels. This threshold value is determined by the algorithm of FIG. 2 as follows. First, maximum and minimum gray scale values of the pixels are defined as a and b respectively and set with initialized values. The stored gray scale value for each pixel is then compared with established values a and b. If a pixel has a gray scale value greater than a, a is redefined as that value. Similarly, if the gray scale value of any pixel is smaller than b, b is redefined as the gray scale value of that pixel. This process is sequentially performed with respect to the gray scale values for all pixels and results in values a and b equal to the largest and smallest gray scale values of pixels within the image frame. These values are summed and divided by two to obtain the threshold gray scale value.

With reference to FIG. 4(a), object 11, having a given gray scale value on a background having a different gray scale value, is shown superimposed on a matrix of squares representing 8 by 8 pixels. Each square contains a number from 0 to 10 representing the average gray scale value of that pixel as detected by a sensor element in imaging device 10.

As a complete scan of the pixels of an image frame is completed, the values for a and b are established. FIG. 4(b) shows final values of 10 and 2 for a and b respectively. This results in a threshold gray scale value of 6.

Figure 3A:
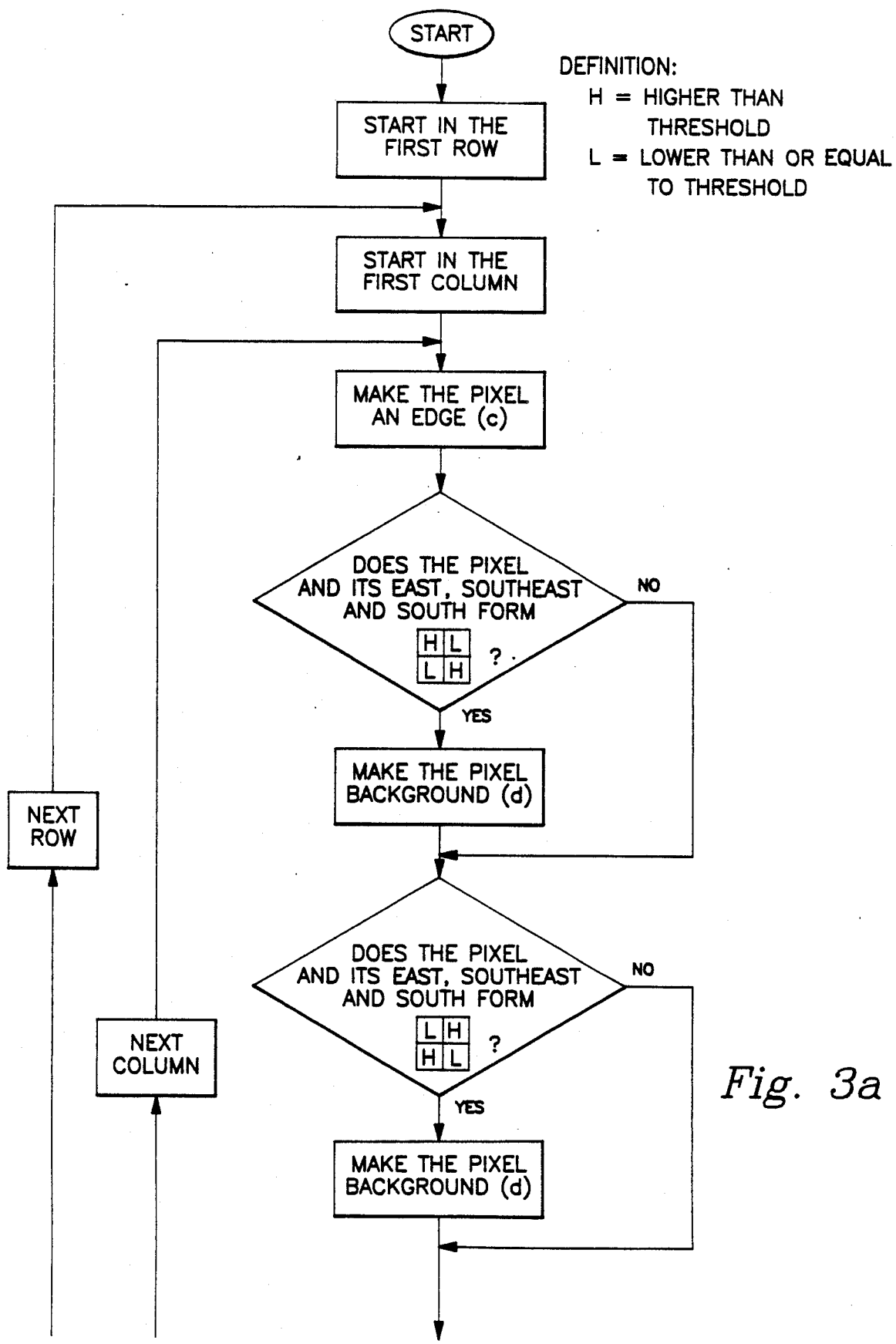
FIGS. 3a and 3b collectively are a logic and flow diagram of an edge detection algorithm used in the system of FIG. 1.
Figure 3B:
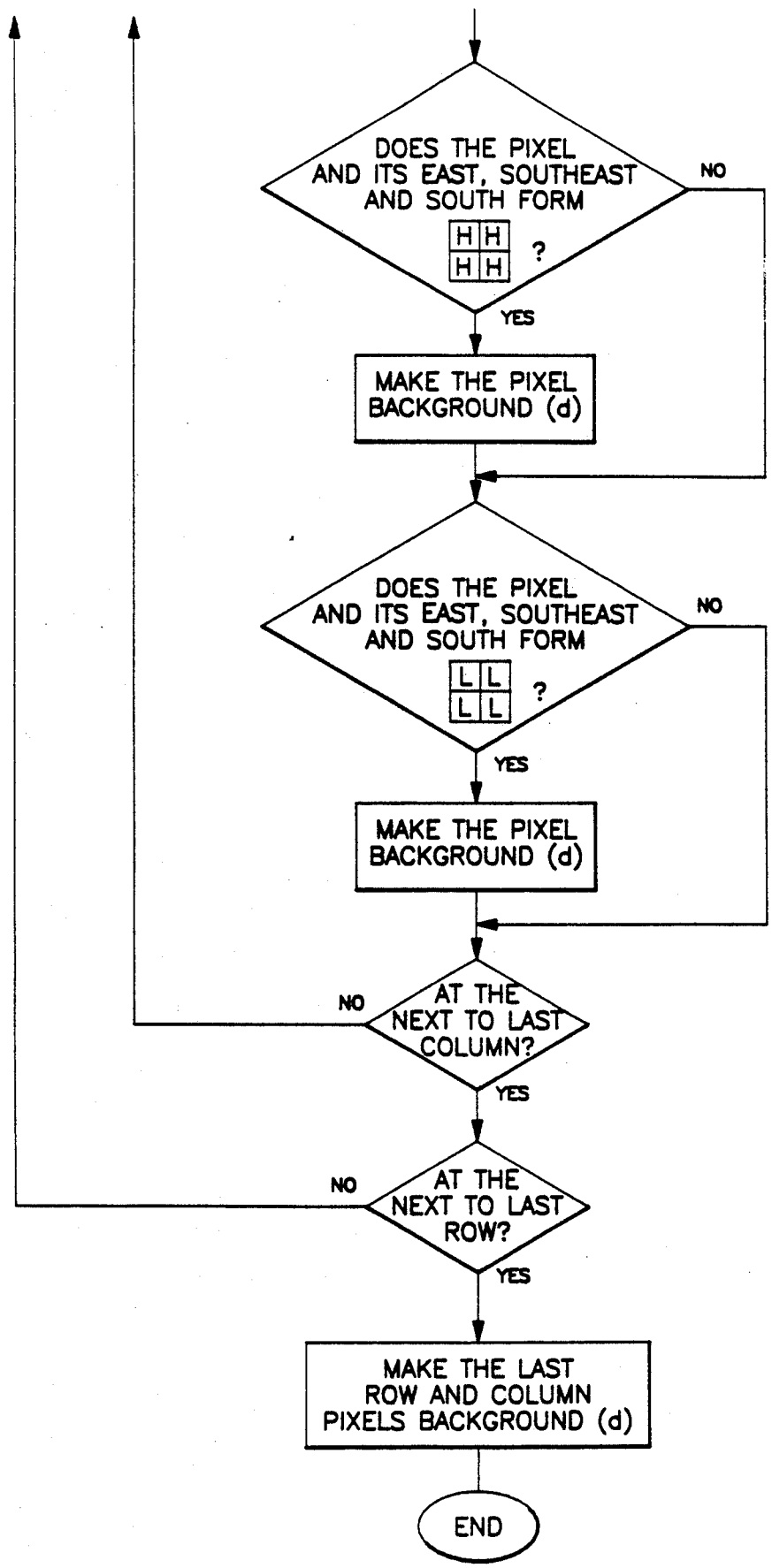

As disclosed for the edge detection algorithm of FIG. 3 and illustrated in FIG. 4(c), the gray scale value of each pixel is compared with the threshold gray scale value and a further plurality of values is generated, this plurality containing only first and second values, the first value occurring if the gray scale value of a pixel is less than or equal to the threshold value and the second value occurring if the gray scale value of a pixel is greater than the threshold gray scale value.

This plurality of values is then examined in groups of four corresponding to square groupings of four adjacent pixels, and a final array of values based on this examination is generated. The values in this array of values are also limited to one of two values a and c, depending on whether or not an edge of the object is represented. Specifically, the final array contains the first value corresponding to each square grouping in which the diagonal values are the same and the second value if the diagonal values of the corresponding square array are different. The latter condition indicates that an edge has been detected between the corresponding pixels in the image frame. The arrangement of the second values in the final array approximates (resolution depending on the number of pixels) the complete edges of the object, as shown in FIG. 4(d).

In accordance with the foregoing description, the applicant has provided a unique system and method for extracting object edge information from an image formed of an array of pixels of varying gray scale values. The method and system are simple and require relatively little memory and processing capability, thus contributing to low cost of the system. Although a particular embodiment of the system is shown for illustrative purposes, other modifications and variations will be apparent to those of ordinary skill in the relevant arts. It is not intended that coverage be limited to the illustrated embodiment, but only by the terms of the following claims.

What is claimed is:

1. In a system in which an image frame formed of a two dimensional array of pixels is represented by a first plurality of values, each value representing the gray scale of a separate pixel in the image frame, means for determining the edges of an object in the image frame, comprising:

means for determining a gray scale threshold value;

means for producing a second plurality of values comprising a first value for each pixel whose gray scale value has a predetermined relationship to the threshold value and a second value for each pixel whose gray scale value does not have the predetermined relationship to the threshold value; and means for examining groups of values in the second plurality of values, the groups corresponding to square groupings of four adjacent pixels, each group including first and second pairs of values corresponding to pairs of pixels located along orthogonal diagonals respectively of a square grouping of four adjacent pixels, and producing a two dimensional array of values arranged to correspond to the arrangement of the square groupings of four adjacent pixels, each value in the array having either a third or fourth value, said means for examining compares one value in a pair with the other value in said pair, said comparison being performed in both pairs, the third value occurring only if both values in said first pair are the same and both values in said second pair are the same, whereby the fourth values are arranged to represent the edges of the object in the image frame.

2. The system of claim 1 wherein the means for producing a second plurality of values produces the first value for each pixel whose gray scale value is less than or equal to the threshold value, and produces the second value for each pixel whose gray scale value is greater than the threshold value.

3. The system of claim 2 wherein said means for examining groups of values in the second plurality of values sequentially examines groups corresponding to successive square groupings of four adjacent pixels.

4. The system of claim 3 in which said means for determining a gray scale threshold value determines the gray scale threshold value by examining the gray scale values of all pixels in the array of pixels and establishes the gray scale threshold value as the median value of the gray scale values of the pixels.

5. A method for determining and representing the edges of an object in an image frame formed of a two dimensional array of pixels represented by a first plurality of values, each value representing the gray scale of a separate pixel in the image frame, the method comprising the steps of:

determining a gray scale threshold value based o the gray scale values of the pixels;

producing a plurality of values comprising a first value for each pixel whose gray scale value has a predetermined relationship to the threshold value and a second value for each pixel whose gray scale value does not have the predetermined relationship to the threshold value; and examining groups of values in the second plurality of values corresponding to square groupings of four adjacent pixels, each group including first and second pairs of values corresponding to pairs of pixels located along orthogonal diagonals respectively of a square grouping of four adjacent pixels and producing a two dimensional array of values arranged to correspond to the arrangement of the square groupings of four adjacent pixels by comparing one value in a pair with the other value in said pair, said comparison being done for each pair, each value in the array having either a third or fourth value, the third value occurring only if both values in the first pair are the same and both values in the second pair are the same, whereby the fourth values are arranged to represent the edges of the object in the image frame.

6. The method of claim 5 wherein the step of producing a second plurality of values produces the first value for each pixel whose gray scale value is less than or equal to the threshold value, and produces the second value for each pixel whose gray scale value is greater than the threshold value.

7. The method of claim 6 wherein the step of determining a gray scale threshold value comprises:

examining the gray scale values of all pixels in the two dimensional array of pixels; and establishing the median gray scale value of the pixels as the gray scale threshold value.

8. The method of claim 7 wherein the step of examining groups of values in the second plurality of values comprises sequentially examining successive square groupings of four adjacent pixels.

9. The method of claim 7 wherein the step of determining a gray scale threshold value further comprises:

sequentially comparing the gray scale values of individual pixels in the two dimensional array of pixels with stored intermediate maximum and minimum values;

setting the intermediate maximum value equal to the gray scale value of a pixel if the gray scale value thereof is greater than the previous intermediate maximum value;

setting the intermediate minimum value equal to the gray scale value of a pixel if the gray scale value thereof is less than the previous intermediate minimum value; and establishing the median of the final intermediate maximum and minimum values as the gray scale threshold value.

* * * * *